United States Patent Office 3,711,437
Patented Jan. 16, 1973

3,711,437
PROCESS FOR THE PRODUCTION OF AQUEOUS DISPERSIONS HAVING A HIGH SURFACE TENSION OF CARBOXYL-GROUP-CONTAINING SYNTHETIC RUBBER
Alfred Wieland and Georg Schroeder, Marl, Germany, assignors to Chemische Werke Huls A.G., Marl, Germany
No Drawing. Filed Dec. 10, 1969, Ser. No. 884,049
Claims priority, application Germany, Dec. 12, 1968, P 18 14 209.1
Int. Cl. C08d 7/10, 9/02
U.S. Cl. 260—29.7 W       13 Claims

ABSTRACT OF THE DISCLOSURE

High surface tension aqueous dispersions of synthetic rubber containing carboxyl groups are prepared by polymerizing a monomeric mixture of a diolefin, a vinyl compound and a monoethylenically unsaturated carboxylic acid in the aqueous phase in the presence of 0.025–0.1% of a sulfonate emulsifier, 0.5–3.0% of a polyethylene glycol of a molecular weight of 300–3,000 and $10^{-2}$ to $10^{-5}$% of iron ions, by weight calculated on the mixture of monomers.

BACKGROUND OF THE INVENTION

This invention relates to high surface tension aqueous dispersions of synthetic rubbers which contain a minor quantity of carboxyl groups, especially of rubbers based on diolefins, vinyl compounds and monoethylenically unsaturated carboxylic acids.

The production of aqueous synthetic rubber dispersions containing carboxyl groups is conventional. See U.S. Pat. 2,724,707. Because in the presence of water, the salts of the ethylenically unsaturated carboxylic acids employed are barely dissolved in the other water-insoluble monomers of diolefin and vinyl compounds, the process is conducted at low pH values of between 5 and 2. However, at these pH values, the selection of suitable emulsifiers is limited. In particular, only emulsifiers of the sulfate or sulfonate type can be used, i.e. anionic emulsifiers, the acid groups of which have a high dissociation constant.

The carboxylated synthetic rubber dispersions obtained during the polymerization, called carboxylated latices hereinbelow, which exhibit a pH of between 2 and 5, are neutralized after the polymerization before processing, since otherwise corrosion of the processing machines would occur. Due to the neutralization, the surface tension of the carboxyl-group-containing latices is greatly reduced. Moreover, the tendency of the latices to foam is considerably increased. As a result, during the processing of these latices, particularly on high-speed machines, substantial problems occur.

In order to avoid these disadvantages and in order to restrict the proportion of anionic emulsifiers, so-called nonionic emulsifiers, e.g., fatty alcohol polyglycol ethers, have also been employed in addition to the anionic emulsifiers. Such a measure, however, does not eliminate the above-described disadvantages, especially the reduced surface tension.

Although the polymerization has also been conducted even in the absence of emulsifiers, such a mode of operation requires an undesired increase in the concentration of the polymerization initiator which forms free radicals (hereinafter referred to as the "activator"). Since the hydrophilic activator fragments, during the polymerization, are built into or grafted onto the polymerized product, the polymer films produced from these latices exhibit a markedly decreased water resistance. Also, when operating in the absence of emulsifiers, significant proportions of coagulate are formed in the latex, which proportions can be present, in part, in larger conglomerations, or can also occur as so-called gels in particle diameters of between 10 and 100μ.

It is an object of this invention to produce carboxylated latices which retain their high surface tension during the neutralization and do not exhibit the above-described disadvantages of gel or coagulate formation and reduced water resistance of the polymer films produced therefrom. Other objects will be apparent to those skilled in the art to which this invention pertains.

SUMMARY OF THE INVENTION

According to this invention, carboxylated latices which retain their high surface tension during the neutralization and do not exhibit the above-described disadvantages of gel or coagulate formation and reduced water resistance of the polymer films produced therefrom are produced by conducting the polymerization in the presence of 0.025 to 0.1% by weight of an emulsifier of the sulfonate type, 0.5 to 3.0% by weight of a polyethylene glycol having an average molecular weight of between 300 and 3,000, and $10^{-2}$ to $10^{-5}$% of iron ions.

DETAILED DESCRIPTION OF THE INVENTION

As used herein, carboxylated latices having high surface tensions mean those having a surface tension of between 45 and 70, particularly 50–65 dyne/cm.

The mixture of monomers which are polymerized in the process of this invention contain a conjugated diolefinic unsaturated hydrocarbon or substituted hydrocarbon, a vinyl compound the ethylenic double bond of which is activated by a group other than a carboxylic acid, and a monoethylenically unsaturated carboxylic acid. In particular, these mixtures contain 74.5–20%, preferably 74.5–25%, by weight of a diolefin, 25–70% by weight of a vinyl compound, and 0.5–10%, preferably 0.5–5%, by weight of a monoethylenically unsaturated carboxylic acid.

The diolefins employed as the monomers in the process of this invention are conjugated diolefins, which include both the substituted and unsubstituted ethylenically diunsaturated hydrocarbons, generally of $C_4$ to $C_{12}$, preferably $C_4$ to $C_6$ carbon atoms, e.g., butadiene or substituted butadienes, such as isoprene, chlorobutadiene. Preferably, butadiene is employed. The diolefins are utilized in amounts of 74.5–20% by weight, preferably 74.5–25% by weight, based on the mixture of monomers.

The vinyl compounds employed in the process of this invention are α-mono-ethylenically unsaturated compounds of generally $C_3$ to $C_{12}$, preferably $C_3$ to $C_8$ carbon atoms whose double bond is activated by other than a carboxylic acid group. In other words, the groups attached to the olefinic chain are e.g. benzene, amide, pyridine.

Examples of such vinyl compounds are styrene, substituted styrenes, acrylonitrile, acrylamide, vinylpyridine, individually or in a mixture, preferably styrene, alone or as a mixture with acrylonitrile. When using a styrene-acrylonitrile mixture, the weight ratio of styrene to acrylonitrile is 1:0.2 to 1:0, preferably from 1:0.1 to 1:0. The vinyl compounds are employed in amounts of 25–75% by weight, particularly 25–70% by weight, likewise based on the mixture of monomers.

The ethylenically unsaturated carboxylic acid can contain from 3 to 20, preferably 3 to 10, and most preferably 3 to 5 carbon atoms, from 1 to 5, preferably 1 or 2, carboxyl groups and from 1 to 5, preferably 1, vinylic double bond. Examples of monobasic acids are acrylic acid, methacrylic acid, which can be employed singly or together as a mixture. Optionally, polybasically unsaturated carboxylic acids can also be employed, e.g., fumaric acid, itaconic acid, citraconic acid.

The monoethylenically unsaturated monocarboxylic acids are preferred, particularly acrylic acid and methacrylic acid. The carboxylic acids are employed in amounts of 0.5–10% by weight, particularly 0.5–5% by weight, calculated on the mixture of monomers.

The unsaturated acid can also be replaced, in part, by up to 50% by weight, of a corresponding ester with an alcohol of 1–8 carbon atoms, preferably the methyl or ethyl ester, e.g., methyl acrylate and methyl methacrylate.

Sulfonate emulsifiers used in the process of this invention include the conventional alkyl, aryl and alkylaryl sulfonates wherein the alkyl chain contains 10–22 carbon atoms in case of the alkyl and paraffin sulfonates, and 8–15 carbon atoms, particularly 10–14 carbon atoms, in case of the alkylaryl sulfonates, e.g., dodecylbenzene sulfonate. Preferably, paraffin sulfonates are employed having an average chain length of 12–20 carbon atoms, especially those having an average chain length of 13–16 carbon atoms. Examples of other sulfonate emulsifiers which can be used are sulfonated castor, coconut, peanut, soybean and other vegetable oils, sulfonated grease, lard, neatsfoot, tallow, and other fish oils and animal fats, and sulfonated tall oil, paraffins and other sulfonated hydrocarbons, and sulfonated alkylated aromatics, e.g., sodium dodecylbenzenesulfonic acid.

The amount of sulfonate emulsifier employed must be within the limits of 0.025 and 0.1% by weight. Below 0.025%, the polymerization behavior approaches that exhibited when the process is conducted in the absence of emulsifiers, i.e., the proportion of coagulate and gels increases, even when otherwise following the process of this invention. Above 0.1% by weight, the latex particles become too small.

If a paraffin sulfate, e.g., sodium lauryl sulfate, is employed in place of a paraffin sulfonate, the latex particles, in an undesirable manner, become even smaller. Such a behavior could not be predicted, since the critical micelle concentration of the lauryl sulfate is substantially higher, viz., 0.1%, than, for example, that of a $C_{15}$-sulfonate, which is $2.8 \times 10^{-2}\%$. Consequently, the reverse behavior would be expected.

The polyethylene glycol ethers have an average molecular weight of between 300 and 3,000, calculated from their hydroxyl number. In particular, polyethylene glycols are employed having an average molecular weight of between 600 and 1,000. The polyethylene glycol ethers are not usually considered emulsifiers since they reduce the surface tension only to a minor extent, e.g. from 70 to 60 dyn/cm. Surprisingly, this additive also further stabilizes the latex against coagulation. The polyethylene glycol ethers are employed in amounts of 0.5–3% by weight, preferably 1–3% by weight.

The process of this invention is conducted in the additional presence of $10^{-2}\%$ to $10^{-5}\%$, preferably $10^{-3}\%$ to $10^{-4}\%$ and most preferably about $10^{-4}\%$ of iron ions, either divalent or trivalent, calculated on the weight of the monomer mixture. The presence of iron ions unexpectedly reduces the tendency of gel formation even further, which permits the emulsifier content to be maintained very low so that during subsequent neutralization the surface tension is not decreased significantly. Suitable water-soluble iron salts which can be used to supply the iron ions are both the bivalent and trivalent iron salts, e.g., of organic and inorganic acids, particularly those of the inorganic acids, e.g., sulfuric, hydrohalic, and nitric acids. Especially suitable are ferrous sulfate

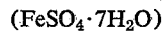

$(FeSO_4 \cdot 7H_2O)$ or ferric ammonium sulfate $(FeNH_4(SO_4)_2 \cdot 12H_2O)$, ferric chloride ferrous chloride, ferric formate, ferric ammonium oxalate, ferric oxalate, ferrous acetate.

The iron salts are generally employed in amounts of $10^{-1}$ to $10^{-5}$, preferably $10^{-2}$ to $10^{-4}$, percent by weight, based on the mixture of monomers, in order to supply the requisite concentration of iron ions in the aqueous emulsion. The weight refers to the gross weight of the salt, including any water of hydration or crystallization that may be present.

Iron salts wherein the iron is complex-bound, such as, for example, in ferrocyanide or ferric cyanide, should not be used. Moreover, as shown below by the comparative experiments, the effect of the iron ions is cancelled out by the addition of complex-forming agents, such as, for example, trisodium nitrilotriacetate or tetrasodium ethylenediamine-tetraacetate, so that the thus-formed latex contains a markedly increased proportion of gels.

Certain anions are known to have an adverse effect upon polymerizations of the type employed in the process of this invention. Obviously, the iron ions should not be supplied by an iron salt having such a disadvantageous influence on the polymerization. For example, iron nitrite should not be used because of the adverse effect of the nitrite ion.

Suitable activators employed in the polymerization are the conventional water-soluble, radical-forming activators, particularly potassium or ammonium persulfate, preferably in amounts of 0.2–0.8% by weight, based on the mixture of monomers.

Additionally, reducing agents, e.g., sodium bisulfite, can be added, for example, in amounts of 0.05–0.2% by weight, based on the mixture of monomers.

The polymerization is preferably conducted in the presence of conventional regulators, such as tert.-dodecyl mercaptan. These regulators are employed in amounts of 0–1.0%, particularly 0.1–0.6%, based on the mixture of monomers.

The polymerization temperature range generally is between 40 and 80° C., especially between 55 and 75° C. The polymerization is generally conducted to complete conversion. However, the process can be terminated at any time after a conversion of about 80%.

The pH during the polymerization is less than 5 and more specifically, ranges between 2 and 5. If necessary, the pH can be adjusted by the addition of ammonia. After the polymerization, the pH of the latex is adjusted to between 7 and 9, e.g., with ammonia or aqueous sodium hydroxide, and optionally deodorized and concentrated.

The resulting latex contains the monomers in a weight ratio of about 74.5:25:0.5 to 20:70:10 of diolefin, vinyl compound and unsaturated carboxylic acid, respectively.

The latices obtained in accordance with this process are eminently suitable for the production of paper coating paints. They combine good stability with conventional coating additives, such as pigments, fillers, thickening agents, etc., e.g., chalk, $TiO_2$, satin white, or starch, to produce a latex formulation having a high surface tension and low foaming tendency. The resulting coating paints have good resistance in the pick test upon pressure, and are particularly effective in conjunction with optical brighteners. Formulations which are used are latices with a total solid (TS) from about 50%, e.g.

32% by weight of butadiene,
67% by weight of styrene,
1% by weight of acrylic acid, and
40% by weight of butadiene,
57% by weight of styrene,
3% by weight of acrylic acid.

These latices are binders in e.g. paper coating paints, wherein the latex (TS) is used in an amount of 10 to 30% by weight, according to the special need of the employer. The rest of the ingredients are mostly minerals like chalk, titanium dioxide, satin white, china clay or mixtures thereof. Additional binders may be used, like starch and casein in amounts of 0 to 20% by weight, relating to the TS. Further additions of the paint formula are thickeners and aging stabilizers.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Example 1

The following components are charged into a 12-liter stainless steel polymerization kettle:

143 parts by weight of water,
0.5 part by weight of tert.-dodecyl mercaptan,
0.001 part by weight of $FeNH(SO_4)_2 \cdot 12H_2O$,
0.05 part by weight of (100%) paraffin sulfonate having an average chain length of 15 carbon atoms,
1.0 part by weight of polyethylene glycol having an average molecular weight of 600,
0.5 part by weight of $K_2S_2O_8$,
65 parts by weight of styrene, and
1 part by weight of acrylic acid.

After purging several times with $N_2$ and evacuation, there is then added 32 parts by weight of butadiene.

The temperature is brought to 70° C. After 11 hours, the polymerization is terminated. The proportion of coagulate is only 0.3%. The dispersion does not contain any gels. The surface tension is 68 dyn./cm., the dry solids content is 41%. The dispersion is brought to a pH of 8.5 with ammonia. The dispersion can be made odorless with steam, without the separation of coagulate, and can be concentrated to a dry content of 50%.

A specific composition of a paper coating paint contains

|  | Parts by weight |
|---|---|
| China clay | 70 |
| Satin white | 30 |
| Casein | 10 |
| Latex (TS) (34 parts by weight of butadiene and 65 parts by weight of styrene and 1 part by weight of acrylic acid) | 10 |
| Brightening agent | 0.2 |
| Anti-foaming agent | 0.2 |
| Water | 150 |

Example 2

The following components are introduced into a 12-liter stainless steel polymerization kettle:

200 parts by weight of water,
0.5 part by weight of tert.-dodecyl mercaptan,
0.5 part by weight of $(NH_4)_2S_2O_8$,
0.1 part by weight of $Na_2S_2O_5$,
0.05 part by weight of (100%) paraffin sulfonate having an average chain length of 15 carbon atoms,
1.0 part by weight of polyethylene glycol having an average molecular weight of 600,
0.001 part by weight of $FeSO_4 \cdot 7H_2O$,
65 parts by weight of styrene, and
3 parts by weight of acrylic acid.

After purging with $N_2$ and evacuation, there is added 32 parts by weight of butadiene.

The temperature is brought to 70° C. After 8 hours, the polymerization is terminated. The proportion of coagulate is only 0.3%; the dispersion does not contain any gels. The surface tension is 65 dyn./cm., the dry content is 34.1%. By means of ammonia, the dispersion is brought to a pH of 8.0. The dispersion can be deodorized with steam, without the separation of coagulate, and can be concentrated to a dry content of 50%.

Comparative Example A

The polymerization is conducted as in Example 2, except the iron ions are bound by the addition of 0.001 part by weight of tetrasodium ethylenediaminetetraacetate. The proportion of coagulate is increased to 5.2%. Furthermore, numerous gels are present.

Comparative Example B

The polymerization is carried out as in Example 2, except in the absence of the emulsifier and the iron ions. In this case, the proportion of coagulate is minor, namely, 0.3%. However, very many gels are present.

Comparative Example C

Comparative Example B is repeated, except in place of a polyethylene glycol having an average molecular weight of 600, a polyethylene glycol having a molecular weight of 12,000 is employed. The resulting latex is completely coagulated.

The results of Example 2 and Comparative Examples A, B, and C are set forth in the following table.

|  | Paraffin sulfonate $\phi$ 15 C [1] | Polyethylene glycol (molecular weight) | $Na_4$-ethylenediaminetetraacetate | $FeSO_4 \cdot 7H_2O$ | Coagulate, percent | Gels |
|---|---|---|---|---|---|---|
| Example 2 | 0.05 | 1.0 (600) |  | $10^{-3}$ | 0.3 | None. |
| Comparative example: |  |  |  |  |  |  |
| A | 0.05 | 1.0 (600) | $10^{-3}$ |  | 5.2 | Gels. |
| B |  | 1.0 (600) |  |  | 0.3 | Gels. |
| C |  | 1.0 (12,000) |  |  | [2] | [2] |

[1] Known under the Trademark Mersolat ®.
[2] Completely coagulated.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In the polymerization of a mixture of monomers comprising on a weight basis, 74.5–20% of a diolefin, 25–70% of a vinyl compound and 0.5–10% of an alpha ethylenically unsaturated carboxylic acid, in the aqueous phase, the improvement which comprises conducting the polymerization in the presence of (a) of 0.025 to 0.1% by weight of an alkyl, aryl or alkylaryl sulfonate emulsifier; (b) 0.5 to 3.0% by weight of a polyethylene glycol having an average molecular weight of between 300 and 3,000; and (c) $10^{-2}$ to $10^{-5}$% of free iron ions.

2. A process according to claim 1 wherein a paraffin sulfonate having an average chain length of 12–22 carbon atoms is employed as the sulfonate emulsifier.

3. A process according to claim 1 wherein the polyethylene glycol has an average molecular weight of between 600 and 1,000.

4. A process according to claim 1 wherein the iron ions are provided by a salt selected from the group consisting of ferrous sulfate and ferric ammonium sulfate.

5. A process according to claim 1 wherein the monomer is butadiene, the vinyl compound is selected from the group consisting of styrene and mixtures thereof with acrylonitrile and the unsaturated carboxylic acid is selected from the group consisting of acrylic and methacrylic acid.

6. In the polymerization of a mixture of monomers comprising on a weight basis 74.5–20% of a diolefin, 25–70% of a vinyl compound and 0.5–10% of an alpha ethylenically unsaturated carboxylic acid, in the aqueous phase, the improvement which comprises conducting the polymerization in the presence of 0.5 to 3.0% by weight of a polyethylene glycol having an average molecular weight of between 300 and 3,000.

7. A process according to claim 6 wherein the polythylene glycol has a molecular weight of between 600 and 1,000.

8. A process as defined by claim 6 wherein the polymerization is conducted in the further presence of 0.025 to 0.1% by weight of an alkyl, aryl or alkylaryl sulfonate emulsifier.

9. A high surface tension aqueous dispersion comprising a rubber in parts by weight of 74.5–20% a diolefin of 3–12 carbon atoms, 25–70% of a vinyl compound of 3–12 carbon atoms and 0.5–10% of an alpha ethylenically unsaturated carboxylic acid of 3–20 carbon atoms, and based on the weight of the rubber, $10^{-2}$ to $10^{-5}$% by weight of free iron ions, 0.5 to 3.0% by weight of a polyethylene glycol having an average molecular weight of between 300 and 3,000, and 0.025 to 0.1% by weight of an alkyl, aryl or alkylaryl sulfonate emulsifier.

10. An aqueous dispersion as defined by claim 6 wherein the polyethylene glycol has an average molecular weight of between 600 and 1,000.

11. A process as defined by claim 1 wherein the concentration of free iron ions is $10^{-3}$ to $10^{-4}$%.

12. A process as defined by claim 3 wherein the concentration of free iron ions is $10^{-3}$ to $10^{-4}$%.

13. A process as defined by claim 1 wherein the polyethylene glycol is present in a concentration of 1–3% by weight.

References Cited

UNITED STATES PATENTS

| | | | |
|---|---|---|---|
| 2,323,313 | 7/1943 | Dennstedt | 260—29.7 M |
| 2,649,425 | 8/1953 | Hulse | 260—29.7 M |
| 2,724,707 | 11/1955 | Brown | 260—29.7 M |

FOREIGN PATENTS

| | | | |
|---|---|---|---|
| 1,024,363 | 3/1966 | Great Britain | 260—29.7 M |

OTHER REFERENCES

Schwartz et al.: Surface Active Agents and Detergents, vol. II, 1958, pp. 120 and 121 relied upon.

MORRIS LIEBMAN, Primary Examiner

S. L. FOX, Assistant Examiner

U.S. Cl. X.R.

260—29.7 E, 29.7 M, 29.7 T